United States Patent [19]

Hanish

[11] Patent Number: 5,031,837
[45] Date of Patent: Jul. 16, 1991

[54] DRIP IRRIGATOR

[75] Inventor: Barry N. Hanish, Sherman Oaks, Calif.

[73] Assignee: Raindrip, Inc., Chatsworth, Calif.

[21] Appl. No.: 459,640

[22] Filed: Jan. 2, 1990

[51] Int. Cl.⁵ .............................................. B05B 15/00
[52] U.S. Cl. .................................... 239/267; 239/542
[58] Field of Search ............................ 239/266–269, 239/542, 550, 551, 553; 138/42–46

[56] References Cited

U.S. PATENT DOCUMENTS

| | | |
|---|---|---|
| 3,420,064 | 1/1969 | Blass et al. . |
| 3,604,728 | 9/1971 | Blass et al. . |
| 3,667,685 | 6/1972 | Rinkewich . |
| 3,729,142 | 4/1973 | Rangel-Garza et al. . |
| 3,791,587 | 2/1974 | Drori ................................. 239/542 |
| 3,792,588 | 2/1974 | Gilaad . |
| 3,815,636 | 6/1974 | Menzel . |
| 3,834,628 | 9/1974 | Selman . |
| 3,873,030 | 3/1975 | Barragan ............................ 239/542 |
| 3,882,892 | 5/1975 | Menzel . |
| 3,887,139 | 6/1975 | Pearce . |
| 3,896,999 | 7/1975 | Barragan . |
| 3,998,391 | 12/1976 | Lemelshtrich .................... 239/542 |
| 4,215,822 | 8/1980 | Mehoudar ........................ 239/542 |
| 4,392,616 | 7/1983 | Olson . |
| 4,460,129 | 7/1984 | Olson . |
| 4,589,595 | 5/1986 | Havens . |

Primary Examiner—Andres Kashnikow
Assistant Examiner—Karen B. Merritt
Attorney, Agent, or Firm—Benoit Law Corporation; Luc P. Benoit

[57] ABSTRACT

A drip irrigator consists of only two substantially parallel discs spaced from each other by the depth of a labyrinthine path extending about a central region between these discs and between a liquid inlet and a dripper outlet and consisting of the material of at least one of these discs. The drip irrigator may have a pair of liquid ports on the discs extending from opposite sides of the central region. A method of making a drip irrigator forms the labyrinthine path in a first disc to extend in turns from a liquid inlet about an axis to a dripper outlet. That labyrinthine path initially is laterally open in a plane perpendicularly intersecting that axis, and that labyrinthine path is laterally closed with another disc in that plane.

20 Claims, 3 Drawing Sheets

DRIP IRRIGATOR

BACKGROUND OF THE INVENTION

1. Field of the Invention

The present invention relates to irrigation systems and to trickle or drip irrigation units for dispensing water and other liquids with or without fertilizers for the nourishment of plants and other vegetation below, on and above the ground.

2. Information Disclosure Statement

By way of background, U.S. Pat. No. 3,420,064, by Blass et al., issued Jan. 7, 1969, discloses an irrigation dripper unit containing a continuous elongated helical groove for deriving water in small quantities from a main stream. U.S. Pat. No. 3,604,728, by Blass et al., issued Sept. 14, 1971, also discloses a continuous elongated helical groove in an irrigation dripper unit.

An irrigation device effecting drip action of water from a central tube was disclosed in U.S. Pat. No. 3,667,685, by Isaac Rinkewich, issued June 6, 1972. The flow path of the water in that device is labyrinthine so that the water path continuously reverses in order to create substantial turbulence to maintain in suspension the foreign matter to minimize the likelihood of clogging.

Another dripper for irrigation was disclosed in U.S. Pat. No. 3,729,142, by Rangel-Garza et al., issued Apr. 24, 1973. That irrigation dripper comprises a substantially cylindrical hollow thin walled female member having an open receptacle end and a smooth interior wall surface, a male member for insertion into the female member having ridges on its outher surface for engaging said interior wall and providing between the wall and the valleys between the ridges of the male member a meandering zig-zag liquid low path and discharge means for the liquids between the male and female members thereby providing with the female and male members a liquid dispensing head. That dripper is proposed as an on-line dripper.

Other flow-reducing devices are apparent from U.S. Pat. No. 3,791,587, by Mordeki Drori, issued Feb. 12, 1974, which discloses also a disc-shaped flow retaining member between disc-shaped annular walls of a drip irrigator.

The subsequent U.S. Pat. No. 3,792,588, by Yigal Gilaad, issued Feb. 19, 1974, for a trickle irrigation unit comprising a pair of telescopic members, of which one is formed with a continuous groove forming with the other member a large cross-section flow path having continuous direction-changing bends.

Drippers of the latter type may be referred to as "in-line drippers", since they have two opposite liquid ports for connecting such drippers into one continuous line.

U.S. Pat. No. 3,815,636, by Stanley W.O. Menzel, issued June 11, 1974, disclosed use of an elastomeric member for drip feed pressure control in devices that may be used in-line or on-line.

In this respect, an "on-line" dripper usually has only one liquid input port for connection to a supply line, as shown, for instance, in U.S. Pat. No. 3,834,628, by Herzl Selman, issued Sept. 10, 1974, for trickle irrigation devices comprising an outer housing and an inner core. The contacting surfaces of the housing and core define a chamber and a plurality of separate parallel labyrinths each communicating with the chamber. The core is fixed within the housing by means of threads which define a spirally-extending conduit providing a path, between the water inlet and the chamber to the labyrinths. In one described embodiment, the core is a unitary member formed with both the threads and the labyrinth configuration; and in a second described embodiment the core comprises two sections, one being formed with the threads, and the other being a replaceable annular insert formed with the labyrinth configuration.

In another on-line dripper, interconnected mating housing halves have a disc sandwiched therebetween and carrying a labyrinthine path in the form of two series-connected circular turns distributed over the two major sides thereof. One of these housing halves has the liquid input port integral therewith, while the dripper output is integral with the other housing half. The disc may include a flexible diaphragm acting on an inward projection of the dripper output to alleviate the effect of excessive water pressure.

An anti-clogging drip irrigation valve is disclosed in U.S. Pat. No. 3,896,999, by Jaime S. Barragán, issued July 29, 1975. A button drip feed device for on-line use is disclosed in U.S. Pat. No. 3,882,892, by S.W.O. Menzel, issued May 13, 1975. Another trickle irrigation emitter is disclosed in U.S. Pat. No. 3,887,139, by D.N. Pearce, issued June 3, 1975.

There is a multiplex dripper assembly for sprinkler risers which contains six independent pressure compensating drippers in a single housing having a common input connected to the sprinkler riser. Each dripper has its own tubular dripper output. Six dripper hoses may thus be served by that muliplex dripper assembly.

There further is an in-line dripper in which a cylindrical male member has series of interconnected labyrinthine paths extending along sections of the cylindrical surface in parallel planes extending at right angles to the longitudinal in-line axis of the dripper. The also cylindrical female member closes these labyrinthine paths circumferentially, and the male member has a radial slot forming the dripper outlet at the female member.

Reference may also be had to U.S. Pat. Nos. 4,392,616, issued July 12, 1983 for Self-Perforating Drip Irrigation Device, and 4,460,129, issued July 17, 1984 for Turbulent Flow Emitter, to Donald O. Olson, and to U.S. Pat. No. 4,589,595 by Glenn G. Havens, issued May 20, 1986 for Pressure Compensated Emitter.

SUMMARY OF THE INVENTION

It is a general object of this invention to provide improved drip irrigation and similar devices.

It is a germane object of the invention to provide improved drip irrigators.

It is a related object of this invention to render drip irrigators less bulky than comparable prior-art drip irrigating devices.

It is also an object of this invention to provide low-cost drip irrigators.

Other objects of the invention will become apparent in the further course of this disclosure.

The invention resides in an in-line drip irrigator consisting of only two substantially parallel discs welded to each other and constituting a pair of in-line liquid ports spaced from each other by the depth of a labyrinthine path extending about a central region between these discs and between a liquid inlet communicating with both liquid ports, and a dripper outlet and consisting of the material of both of these discs having conjoined portions delimiting said labyrinthine path between said discs, and having conjoined rims.

The invention resides also in an in-line drip irrigator consisting of only two substantially parallel discs spaced from each other by the depth of a labyrinthine path extending about a central region between these discs and between that central region and a dripper outlet and having a first liquid port integral with one of these discs and a second liquid port integral with the other of said pair of discs, said first and second liquid ports extending from opposite sides of said central region with the labyrinthine path consisting of the material of at least one of these discs welded to the other of said discs.

The invention resides also in a method of making an in-line drip irrigator, comprising in combination the steps of forming a pair of liquid ports out of a pair of discs, forming a labyrinthine path in a first disc of said pair of discs out of material of said first disc to extend in turns from a liquid inlet about an axis to a dripper outlet and being initially laterally open in a plane perpendicularly intersecting that axis, said material of said first disc extending to said plane, and laterally closing the labyrinthine path with another disc in that plane, with said liquid ports being in-line with each other.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
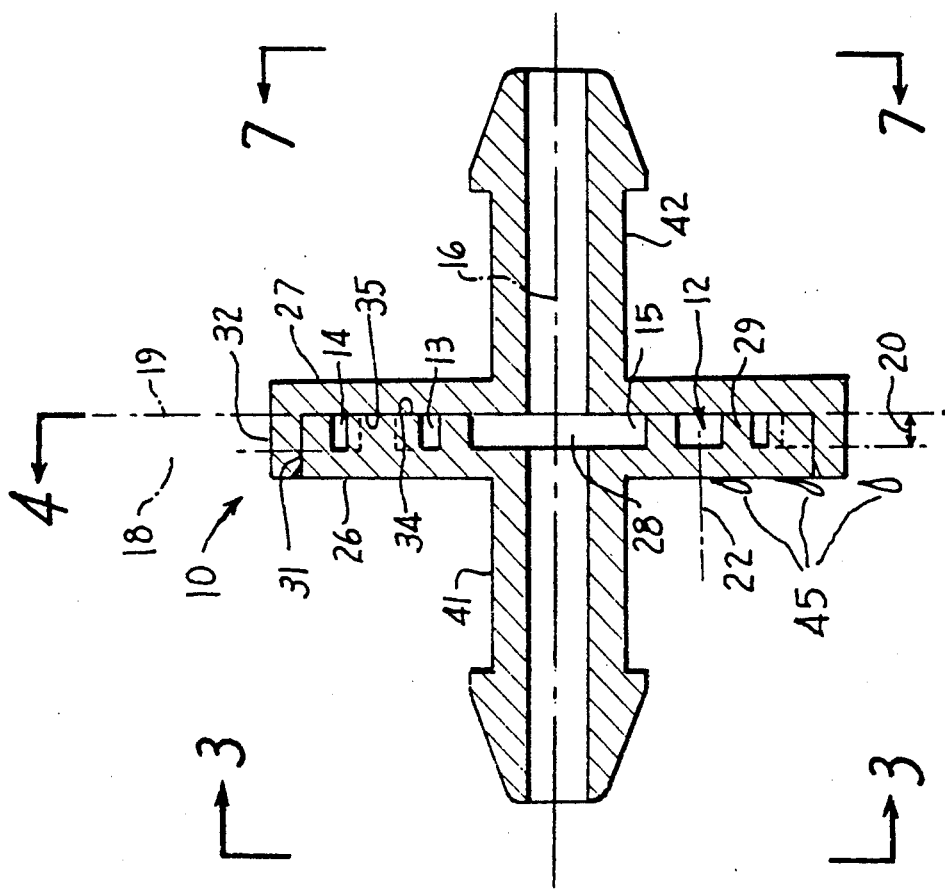
FIG. 1 is a section through a drip irrigator according to a preferred embodiment of the subject invention.

The drip irrigator 10 according to the preferred embodiment of the invention shown in the drawings contains a labyrinthine path 12 extending in turns 13 and 14 from a liquid inlet 15 about an axis 16 to a dripper outlet 17. As apparent from FIGS. 1 and 4, the liquid inlet 15 communicates with the liquid ports 41 and 42. All the turns of the labyrinthine path are located between two planes 18 and 19 spaced by a depth 20 of the labyrinthine path, as indicated by way of example in FIG. 1.

This permits the production of an easy-to-manufacture drip irrigation unit that avoids the inherent bulkiness of prior designs.

The planes 18 and 19 preferably extend at right angles to the axis 16 as seen, for instance, in FIG. 1.

Figure 4:
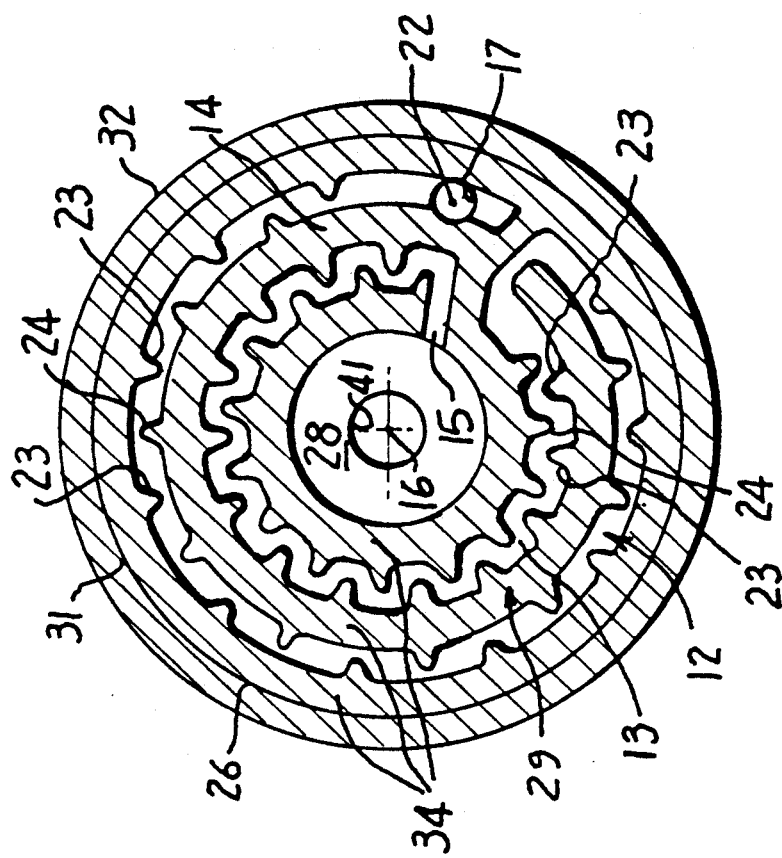
FIG. 4 is a section taken on the line 4—4 in FIG. 1.
Figure 3:
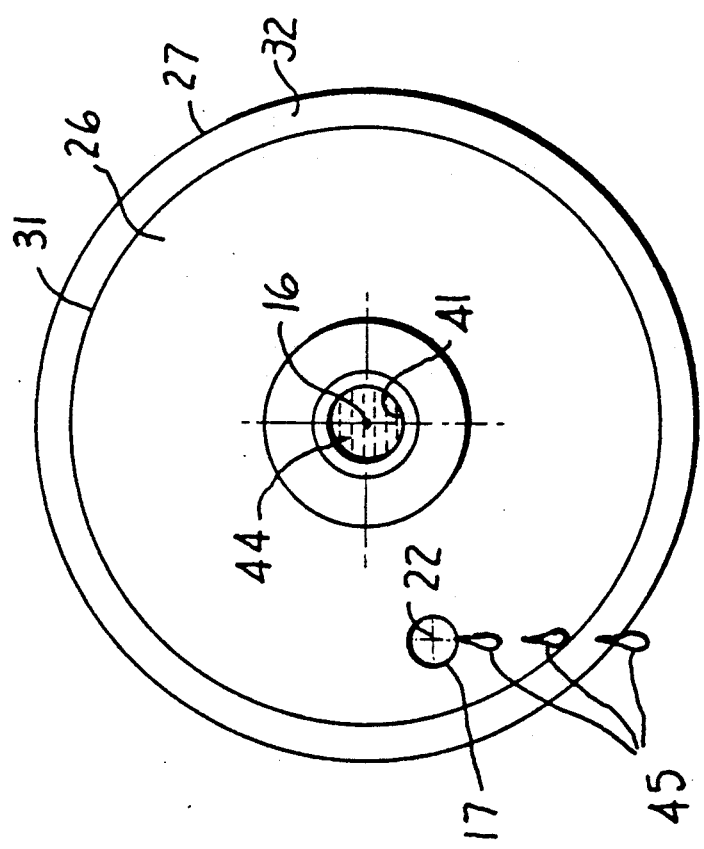
FIG. 3 is a view taken on the line 3—3 in FIG. 1.
Figure 7:
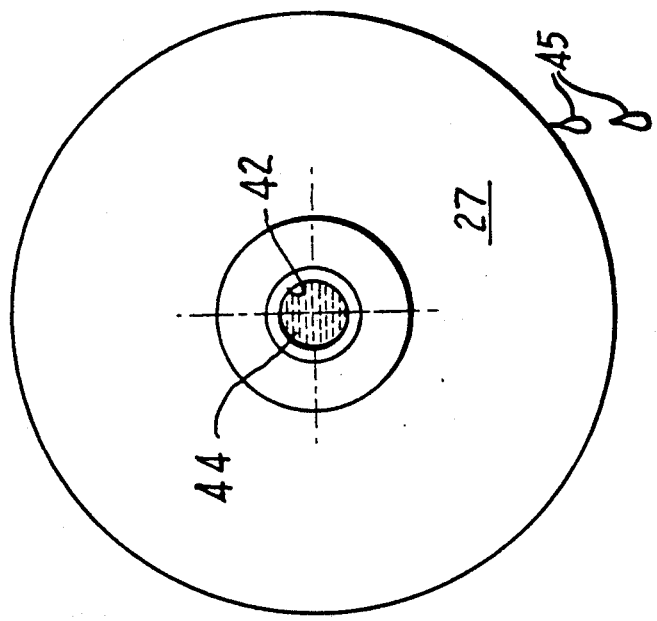
FIG. 7 is a view taken on the line 7—7 in FIG. 5 or on the line 7—7 in FIG. 1.
Figure 5:
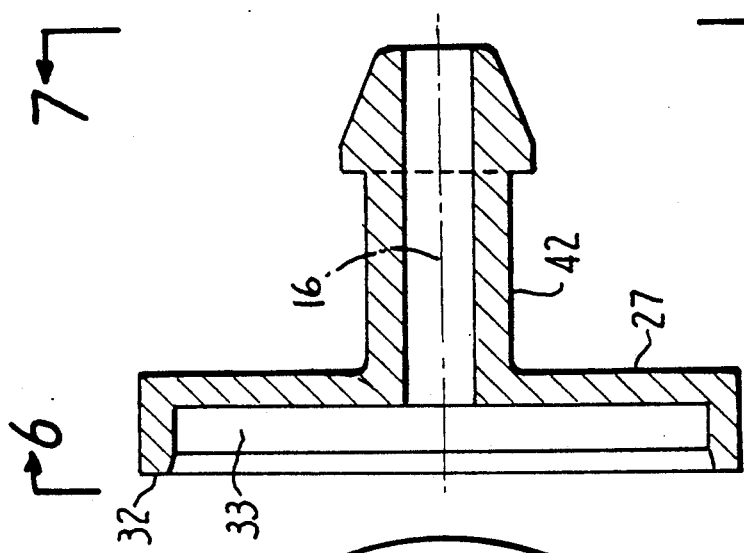
FIG. 5 is a section through another part of the irrigator of FIG. 1, and may also be viewed as a section on the line 5—5 in FIG. 6.
Figure 6:
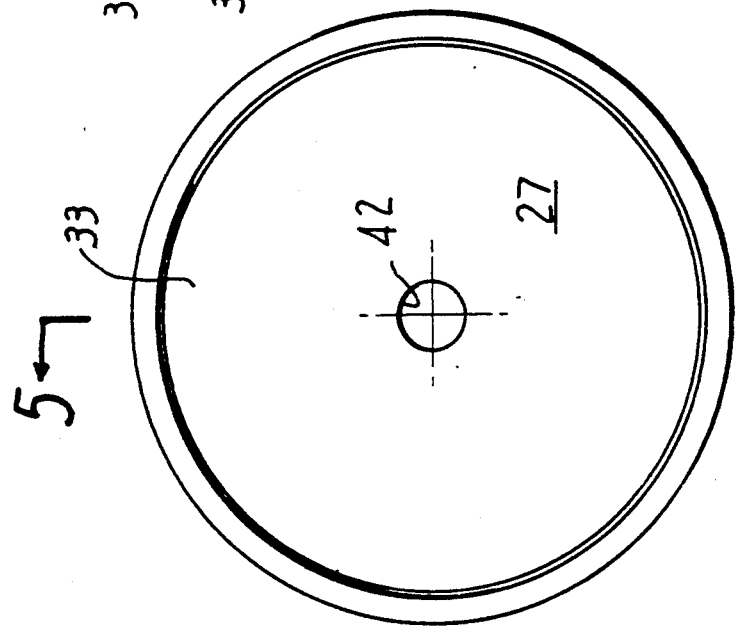
FIG. 6 is a view taken on the line 6—6 in FIG. 5.

In the embodiment according to FIGS. 3 and 4, the dripper outlet 17 has an axis 22 parallel to the longitudinal axis 16 of the drip irrigator 10.

By way of example, the labyrinthine path 12 has interdigitated projections 23 and 24 extending radially of the longitudinal axis 16.

In the illustrated preferred embodiment, the turns 13 and 14 are coaxial, preferably about the axis 16. However, the turns of the labyrinthine path 12 may be arranged in a spiral extending around the axis 16 from the inlet 15 to the dripper outlet 17, as long as the turns of the spiral are between the planes 18 and 19 or are in a plane therebetween.

As seen particularly in FIG. 1, the drip irrigator 10 according to an embodiment of the invention shown in the drawings comprises a pair of substantially parallel discs 26 and 27 spaced from each other by the depth 20 of the labyrinthine path 12, which extends about a central region 28 between these discs and between a liquid inlet 15 and a dripper outlet 17, which may be in one of the discs, between such discs, or in the disc 26 which carries a relief 29 of the labyrinthine path, as shown in FIGS. 3 and 4, for instance.

These discs 26 and 27 have conjoined portions. For instance, the discs have conjoined rims 31 and 32, as seen in FIGS. 1 and 3, for instance. The disc 27 has a cavity 33 for receiving the disc 26.

Figure 2:
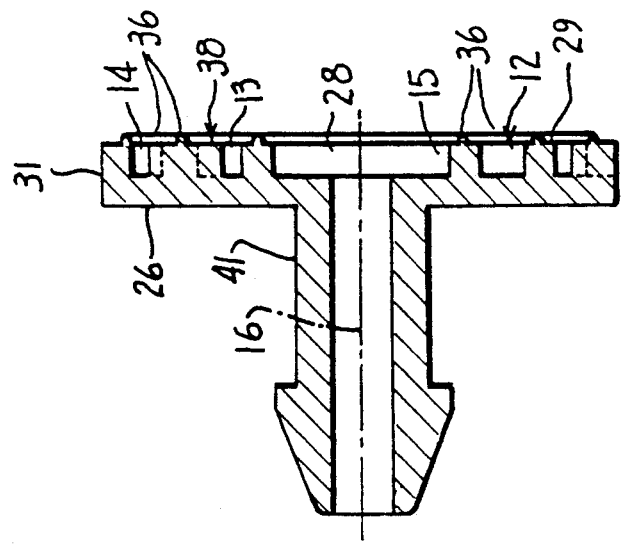
FIG. 2 is a section through a labyrinthine part of 11 the drip irrigator of FIG. 1, prior to assembly thereof.

Preferably the discs 26 and 27 have conjoined portions 34 and 35 delimiting the labyrinthine path 12 between these discs. As seen in FIG. 2, the disc 26, for instance, may be provided with circular ridges 36 facilitating the sealing of the discs to each other so as to establish the labyrinthine path 12. In this or any other suitable manner, the discs 26 and 27 may be permanently joined to each other. Ultrasonic welding may be employed for that purpose. Accordingly, the disc 26 is integral with the disc 27 at circular ridges or portions 34 of the disc 26 or of the labyrinthine relief 38, and along the rims 31 and 32. Simple hatching is shown on portions 34 in FIG. 4 to show this fact, even though various materials, such as metals and plastics, may be used for making or molding the discs 26 and 27.

FIG. 2 shows the labyrinthine path 12 in relief. In this respect, the relief 29 of that labyrinthine path is in one of the discs, such as the disc 26 as shown in FIGS. 2 and 4, and is laterally closed by the other of the discs, such as the disc 27 as shown in FIGS. 1 and 5 to 7. In this respect, disc 26 has ridges 34 or 36 conjoined with the other disc 27.

The discs 26 and 27 thus preferably have conjoined rims 31 and 32 and conjoined portions 34 about the central region 28 and between turns 13 and 14 of the labyrinthine path 12. The conjoined rims may extend about the labyrinthine path 12.

The liquid inlet 15 is in communication with the central region 28 between the discs 26 and 27. The or a liquid inlet may be in either of the discs in communication with the central region 28 between the discs 26 and 27. Preferably, the inlet 15 is in the same disc as the labyrinthine path 12.

The dripper outlet may be somewhere between the discs or may more practically be in one of the discs. As shown in FIGS. 3 and 4, the dripper outlet 17 preferably is in the same disc 26 as the labyrinthine path 12.

Within the scope of the subject invention, the principles herein disclosed could be used in drippers having one liquid inlet and only one outlet, such as the dripper outlet 17. Alternatively, the dripper may have a liquid outlet in addition to the dripper outlet.

As seen in FIG. 4, the labyrinthine path 12 extends about the central region 28 between the discs 26 and 27 and between that central region and a dripper outlet 17, and a pair of liquid ports 41 and 42 on these discs extend from opposite sides of that central region 28. These liquid ports could be offset from each other. However, the liquid ports 41 and 42 are coaxial in the illustrated preferred embodiment of the invention. As shown in FIG. 1 this means that the liquid ports 41 and 42 extend along the central axis 16 of the first and second discs 26 and 27. In this or any similar manner, liquid 44 (indicated only in FIGS. 3 and 7) can flow through the dripper 10 which diverts only a small amount of such liquid for drip irrigation in the form of drops 45 or other small amounts.

One of the liquid ports 41 is integral with one of 31 the discs 26, and the other of the liquid ports 42 is integral with the other of the discs 27. From the hatched lines extending in FIGS. 1 and 2 from the disc 26 into the liquid port 41, and from the hatched lines extending in FIGS. 1 and 5 from the disc 27 into the liquid port 42, it can be seen that these discs 26 and 27 constitute the pair of in-line liquid ports 41 and 42.

The drip irrigator 10 consists of only two substantially parallel discs 26 and 27 spaced from each other by the depth 20 of a labyrinthine path 12 extending about a central region 28 between the discs and between a liquid inlet 15 or 41 and a dipper outlet 17 and consisting of the material of at least one of the discs 26, which may be a metal or plastic, for instance.

By way of example, the dripper 10 may be connected as an in-line dripper in a water supply line together with identical other drippers. The liquid 44 flows through such line and thereby through such series of drippers 10 for the drip irrigation of the soil and plants or other vegetation through drops or other small quantities of liquid. In practice, this enables great savings of water, providing for a very effective irrigation nevertheless.

The subject invention resides also in a method of making a drip irrigator, which is preferably formed as an in-line dripper irrigator 10 as shown in FIG. 1, for instance. This method forms the labyrinthine path 12 in a first disc 26 to extend in turns 13, 14 from a liquid inlet 15, 28 or 41 about an axis 16 to a dripper outlet 17. That labyrinthine path 12 as formed in the disc 26 out of the material of that disc by stamping, molding and the like, initially is laterally open in a plane 19 perpendicularly intersecting the axis 16. As seen from the hatch lines in the disc 26 in FIG. 1, the material of that disc extends to the plane 19. This method laterally closes the labyrinthine path 12 with the other disc 27, such as by ultrasonic welding and the like.

The subject drip irrigators may also be used for purposes other than the irrigation and nourishment of plants. For instance, drip irrigators according to the subject invention may be employed to provide small quantities of liquids in all kind of apparatus and situations, even for the refreshment of animals or humans, for that matter.

The subject extensive disclosure will render apparent or suggest to those skilled in the art various modifications and variations within the spirit and scope of the subject invention and equivalents thereof.

I claim:

1. An in-line drip irrigator consisting of only two substantially parallel discs welded to each other and constituting a pair of in-line liquid ports spaced from each other by the depth of a labyrinthine path extending about a central region between said discs and between a liquid inlet communicating with both liquid ports, and a dripper outlet and consisting of the material of both of said discs having conjoined portions delimiting said labyrinthine path between said discs, and having conjoined rims.

2. A drip irrigator as in claim 1, wherein:
each of said discs constitutes one of said in-line liquid ports.

3. A drip irrigator as in claim 2, wherein:
said dripper outlet is in one of said discs.

4. A drip irrigator as in claim 1, wherein:
a relief of said labyrinthine path is in one of said discs and is laterally closed by the other of said discs.

5. A drip irrigator as in claim 4, wherein:
said discs have conjoined portions about said central region and between turns of said labyrinthine path.

6. A drip irrigator as in claim 1, wherein:
a relief of said labyrinthine path is in one of said discs and has ridges welded to the other of said discs.

7. A drip irrigator as in claim 1, wherein:
said discs have conjoined portions about said central region and between turns of said labyrinthine path.

8. A drip irrigator as in claim 7, wherein:
said dripper outlet is in either of said discs.

9. A drip irrigator as in claim 1, wherein:
said dripper outlet is in one of said discs.

10. An in-line drip irrigator consisting of only two substantially parallel discs spaced from each other by the depth of a labyrinthine path extending about a central region between said discs and between said central region and a dripper outlet and having a first liquid port integral with one of said discs and a second liquid port integral with the other of said pair of discs, said first and second liquid ports extending from opposite sides of said central region;
said labyrinthine path consisting of the material of at least one of said discs welded to the other of said discs.

11. A drip irrigator as in claim 10, wherein:
said liquid ports are coaxial.

12. A drip irrigator as in claim 10, wherein:
said first liquid port is of the same material as said one of said discs; and
said second liquid port is of the same material as said other of said discs.

13. A drip irrigator as in claim 12, wherein:
said liquid ports extend along a central axis of said first and second discs.

14. A method of making an in-line drip irrigator, comprising in combination the steps of:
forming a pair of liquid ports out of a pair of discs;
forming a labyrinthine path in a first disc of said pair of discs out of material of said first disc to extend in turns from a liquid inlet about an axis to a dripper outlet and being initially laterally open in a plane perpendicularly intersecting said axis, said material of said first disc extending to said plane; and
laterally closing said labyrinthine path with another disc in said plane, with said liquid ports being in-line with each other.

15. A method as in claim 14, wherein:
said drip irrigator is formed as an in-line drip irrigator by welding said first and second discs to each other.

16. A method as in claim 15, wherein:
said dripper outlet is provided with an axis parallel to the first-mentioned axis.

17. A method as in claim 14, wherein:
said labyrinthine path is provided with interdigitated projections extending radially of the first-mentioned axis.

18. A method as in claim 17, including the steps of:
providing said labyrinthine path with circular ridges facilitating a sealing of said discs to each other; and
welding said discs to each other at said circular ridges.

19. A method as in claim 14, wherein:
said discs are welded to each other at ridges of said labyrinthine path.

20. A method as in claim 14, including the steps of:
providing said labyrinthine path with circular ridges facilitating a sealing of said discs to each other; and
welding said discs to each other at said circular ridges.

* * * * *